Nov. 8, 1966   H. M. CHAPPELL   3,283,934
FILLER SUPPORT FOR THERMOS BOTTLES
Filed July 23, 1964   2 Sheets-Sheet 1

INVENTOR.
Horace M. Chappell
BY McDougall, Hersh & Scott
Att'ys

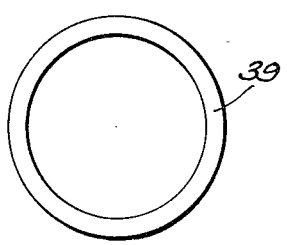
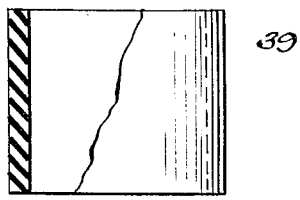
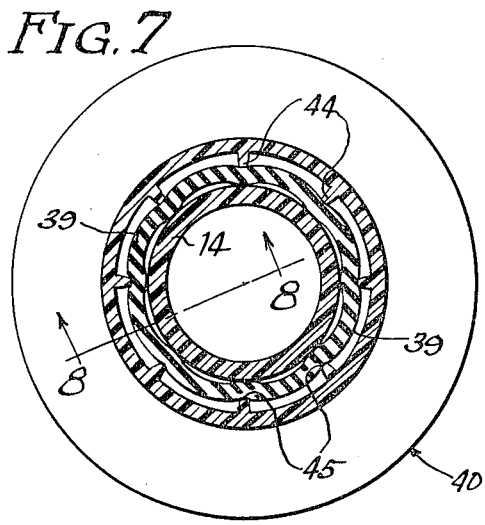
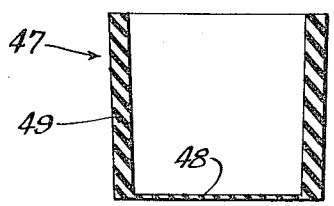
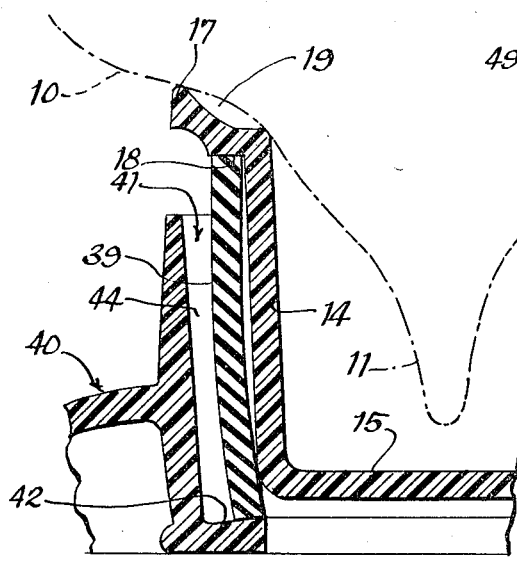
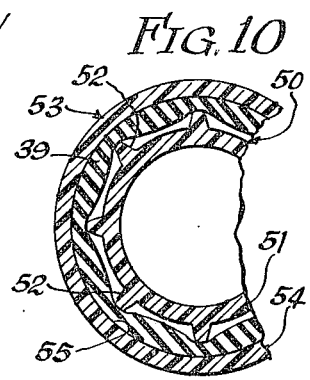

United States Patent Office 3,283,934
Patented Nov. 8, 1966

3,283,934
FILLER SUPPORT FOR THERMOS BOTTLES
Horace M. Chappell, Nashville, Tenn., assignor to Aladdin Industries, Incorporated, Chicago, Ill., a corporation of Illinois
Filed July 23, 1964, Ser. No. 384,619
6 Claims. (Cl. 215—13)

This invention relates to thermos bottles of the well-known type having a vacuum-insulated receptacle or filler which is mounted within a protective jacket.

One object of the present invention is to provide a thermos bottle having a new and improved construction whereby the lower end of the filler is resiliently supported by a soft resilient sleeve or other similar member made of natural or synthetic rubber or other rubbery material.

A further object is to provide such a new and improved filler support which in certain aspects represents an improvement upon the invention disclosed and claimed in the Bramming patent, No. 2,963,187, patented December 6, 1960, for "Filler Support for Vacuum Bottles," and assigned to the same assignee as the present application.

It is a further object to provide such a new and improved filler support in which the rubber supporting sleeve is received within a socket in a socket member which has a plurality of longitudinal ribs or the like projecting into the socket and snugly engaging the rubber sleeve, whereby the sleeve is adapted to bulge outwardly between the ribs when the sleeve is compressed longitudinally.

Another object is to provide a modified construction in which the ribs are on a member which is mounted inside the sleeve rather than outside.

A further object is to provide such a new and improved construction which is effective to obviate buckling of the sleeve so that the sleeve provides a firm and steady yet resilient support for the vacuum-insulated filler.

Further objects and advantages of the present invention will appear from the following description, taken with the accompanying drawings, in which:

FIG. 5 is a plan view of the rubber supporting member for the filler in the thermos bottle of FIG. 1.

FIG. 6 is an elevational view of the rubber supporting member, partly in longitudinal section.

FIG. 7 is a fragmentary sectional view, taken generally along the line 7—7 in FIG. 1, and showing the manner in which the rubber supporting member bulges outwardly when compressed in its position of use.

FIG. 8 is a fragmentary section taken generally along the line 8—8 in FIG. 7.

FIG. 9 is a view similar to FIG. 6 but showing a modified construction.

FIG. 10 is a fragmentary view somewhat similar to FIG. 7 but showing a modified construction.

Figure 1:
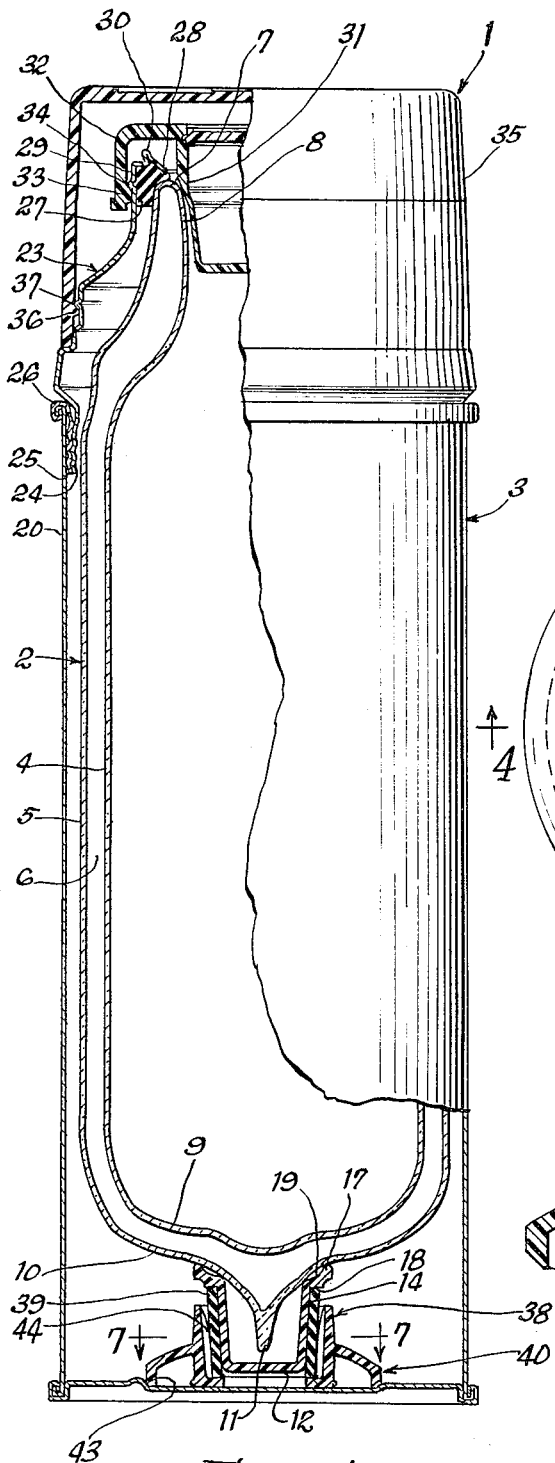
FIG. 1 is an elevational view, partly in longitudinal section, of a thermos bottle having a filler support to be described as an illustrative embodiment of the present invention.
Figure 2:
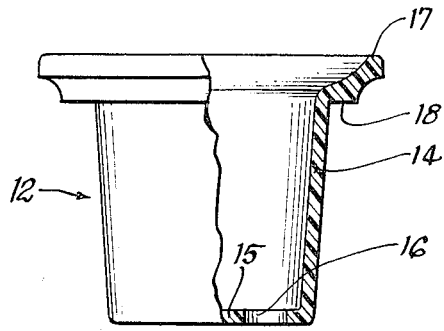
FIG. 2 is an enlarged elevational view, partly in section, of the tubulation protector employed in the thermos bottle of FIG. 1.

It will be seen that FIG. 1 illustrates a thermos bottle 1 of the usual type having a vacuum-insulated receptacle or filler 2 which is mounted within a protective jacket 3. The illustrated filler 2 comprises inner and outer walls or shells 4 and 5, with an evacuated space 6 therebetween. The walls 4 and 5 are normally made of glass. The filler 2 has a rounded annular lip or rim 7 at its upper end, extending between the inner and outer walls 4 and 5. The rim 7 extends around the mouth 8 of the filler 2.

It will be seen that the inner and outer walls 4 and 5 have bottom portions 9 and 10 which are generally of an inverted dome shape. A generally nipple-shape tubulation or tip 11 is formed on the outside of the bottom wall 10 and projects downwardly therefrom, substantially along the central axis of the filler 2. The tubulation 11 constitutes the sealed-off remnant of the tube through which the space 6 between the walls 4 and 5 of the filler was evacuated during the process of manufacturing the filler.

The tubulation 11 is quite fragile and is given the special protection of a tubulation or tip protector 12, which is generally in the form of a cup-shaped housing which encloses the tubulation 11. As shown, the tip protector 12 is made of plastic, but it may be made of metal or other suitable material.

The illustrated tip protector 12 has a side wall 14 which is generally cylindrical but has a slight downward taper. A bottom wall 15 is formed on the side wall 14 and is provided with one or more vent openings 16. At the upper end of the side wall, the tip protector 12 is formed with an annular flange 17 which projects outwardly and upwardly and is adapted to engage the bottom wall 10 of the filler, around tubulation 11. A downwardly facing shoulder 18 is formed on the lower side of the flange 17. As shown in FIG. 1, cement 19 is normally employed to secure the tip protector 12 to the bottom wall 10 of the filler. The cement is applied between the flange 17 and the filler.

The illustrated jacket 3 comprises a cylindrical side wall 20 which is made of metal but might be made of plastic or other suitable materials. A bottom wall 21 is secured to the side wall 20. In this case, a crimped or rolled joint 22 of a permanent character is formed between the bottom wall 21 and the side wall 20, but in some cases the bottom wall might be removable. As shown, the bottom wall 21 is made of metal, but it might be made of plastic or other suitable material. The bottom wall might be formed integrally with the side wall.

The upper portion of the protective jacket 3 takes the form of an annular collar 23 which in this case is removably and adjustably secured to the side wall 20. Thus, the collar 23 is formed with an externally threaded lower end portion 24 adapted to be screwed into an internally threaded ring or other member 25 on the upper end of the side wall 20. In this case, a crimped or rolled joint 26 is formed between the threaded ring 25 and the side wall 20. It will be understood that the threaded member might be otherwise secured to the side wall or might be formed integrally therewith.

The collar 24 retains the filler 2 in the protective jacket 3 and may be removed when it is desired to remove or replace the filler. It will be seen that a sealing gasket or ring 27 is provided between the collar 24 and the rounded upper end or rim 7 of the filler 2. The sealing ring 27 may be made of natural or synthetic rubber or other soft resilient rubbery materials, such as various plastics. To retain the sealing ring 27, the collar 23 is formed with an annular flange 28 which projects inwardly from the cylindrical upper portion 29 of the collar. An annular pouring lip 30 projects upwardly and flares outwardly from the flange 28. It will be seen that the flange 28 overhangs the rounded upper end 7 of the filler 2. The gasket or sealing ring 27 is shaped so that it will conform to the contours of the filler and the collar. It will be understood that the sealing ring 27 prevents any liquid from leaking into the space between the filler 2 and the protective jacket 3.

To close the mouth 8 of the filler 2, the thermos bottle is provided with a stopper or closure 31. In this case, the closure 31 has an outer mounting flange 32 which projects downwardly and has internal screw threads 33 adapted to mate with external threads 34 on the cylindrical upper portion 29 of the collar 23.

The illustrated thermos bottle has the usual cup 35 which may be mounted in an inverted position over the collar 23, so that the cup also serves as a protective cap. The cup 35 is formed with internal threads 36 which are adapted to mate with external threads 37 on the collar 23.

The illustrated thermos bottle 1 is provided with a filter-supporting construction 38 which forms the main subject of the present invention. The filler is resiliently yet firmly supported, to minimize shock on the filler, while insuring that the upper end of the filler may be pressed against the sealing ring 27 with sufficient force to obviate any possibility of leakage between the filler and the sealing ring.

The illustrated filler-supporting construction 38 comprises a soft resilient sleeve or tube 39 which affords the resilient support for the filler. As shown, the sleeve 39 is made of rubber, either natural or synthetic, but it may be made of other soft resilient rubbery materials, such as various plastics. In its free state, the rubber sleeve 39 is preferably cylindrical, as shown to best advantage in FIGS. 5 and 6. The sleeve may simply comprise a short piece of rubber tubing.

The rubber sleeve 39 is adapted to be received snugly around the side wall 14 of the tubulation protector 12. When mounted around the tubulation protector 12, the rubber sleeve 39 is stretched slightly, so that it conforms to the downwardly tapering shape of the side wall 14. The upper end of the rubber sleeve 39 normally engages the downwardly facing shoulder 18 on the tubulation protector 12. The lower end of the rubber sleeve 39 preferably projects below the lower end of the tubulation protector 12.

The rubber sleeve 39 is adapted to be supported by a member 40 which is formed with a socket 41 for receiving the sleeve. An upwardly facing flange or shoulder 42 projects into the lower end of the socket 41 and forms a lower wall which is adapted to support the lower end of the rubber sleeve 39. It will be seen that the shoulder 42 is inclined upwardly and inwardly at a small angle.

The illustrated socket member 40 is made of plastic and is formed separately from the bottom wall 21 of the protective jacket 3, but it will be understood that the socket member may be made of other suitable materials. Moreover, the socket member may be secured to or formed integrally with the bottom wall 21. As shown, the socket member 40 is received and located in a circular recess 43 which is formed in the bottom wall 21. It will be understood that the recess 43 retains the socket member 40 in a centered position on the bottom wall 21.

Figure 3:
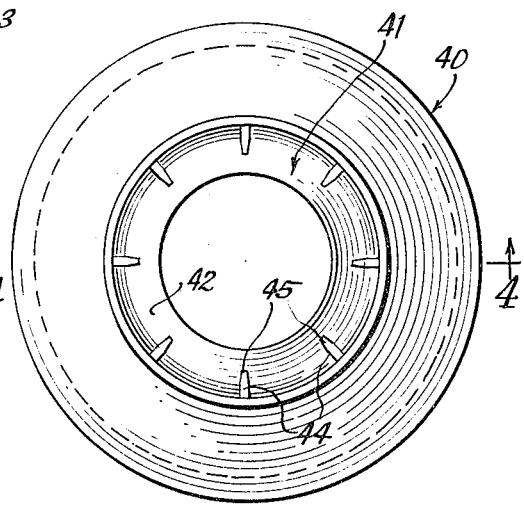
FIG. 3 is an enlarged plan view of a socket member employed in the filler-supporting construction for the thermos bottle of FIG. 1.
Figure 4:
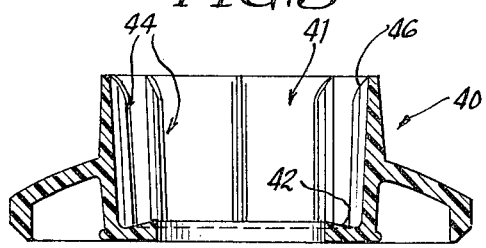
FIG. 4 is a longitudinal section taken through the socket member, generally along the line 4—4 in FIG. 3.

The socket 41 is generally cylindrical in shape but tapers downwardly at a small angle, so as to correspond generally to the taper of the side wall 14 on the tubulation protector 12. In accordance with the present invention, the socket member 40 is formed with a plurality of ribs or other similar elements 44 which project into the socket 41 at angularly spaced intervals. The illustrated socket member 40 has eight narrow ribs 44 which extend longitudinally, relative to the longitudinal axis of the thermos bottle. The rubber sleeve 39 is in snug engagement with the inner edges of the ribs 44. As shown to best advantage in FIG. 3, the ribs 44 may have inner edges 45 which are slightly tapered to reduce the area of engagement with the rubber sleeve 39. Each of the illustrated ribs 44 has an upper end portion 46 which is rounded and tapered upwardly to facilitate the entry of the rubber sleeve 39 into the socket 41.

When the thermos bottle 1 is assembled, the rubber sleeve 39 is slipped around the tubulation protector 12. The socket member 40 is then mounted on the lower end of the rubber sleeve 39. Next, the protective jacket 3 is placed around the filler, and the collar 23 is screwed into the side wall 20 so as to compress the sealing ring 24 between the collar and the rounded upper end portion of the filler 2. To prevent leakage of liquids past the sealing ring 27, the collar 23 is screwed down tightly. The force thus applied to the upper end of the filler 2 is borne by the rubber sleeve 39, which yields in a resilient manner so that the filler will be resiliently yet firmly supported. The compressive force applied between the ends of the rubber sleeve 39 causes the sleeve to bulge outwardly into the spaces between the ribs 44, as shown to best advantage in FIG. 7. The ribs 44 prevent the rubber sleeve 39 from buckling or otherwise becoming distorted into a shape such that the sleeve can no longer carry the compressive load in a stable manner. Such buckling or distortion tends to occur when the sleeve does not have the benefit of the support provided by the radial ribs. It has been found that the ribs control the resilient yielding action of the sleeve and cause the sleeve to bulge or flow outwardly into the spaces between the ridges, so that the sleeve is capable of sustaining high compressive loads without buckling and with a substantially linear relationship between the applied compressive force and the extent to which the sleeve is compressed.

The rubber sleeve also compensates for minor variations in the length of the filler. It is difficult to hold the length of the glass filler within close tolerances by ordinary manufacturing procedures, so that it is necessary to accept and use fillers which vary to some extent from the nominal length, to avoid an excessively high reject rate. Thus, the compression of the rubber sleeve 39 will vary in accordance with the exact length of the filler. With a filler which is longer than the nominal size, the compression of the rubber sleeve will be relatively great, and the compressive force on the sleeve will be high. However, the construction of the present invention enables the rubber sleeve to sustain such high compressive force.

On the other hand, the rubber sleeve is made long enough to afford a firm support for fillers which may be slightly shorter than the nominal length. Even such undersize fillers are firmly supported against damage due to shock. Moreover, sufficient force may be developed between the upper end of the filler and the sealing ring to insure a good seal at this point.

It will be noted that the supporting ribs extend in the direction in which force is applied to the rubber supporting sleeve. The supporting ribs afford external support for the rubber sleeve so that a longer sleeve may be employed than otherwise would be feasible. The ribs prevent the buckling which tends to occur when such longer sleeves are compressed longitudinally. Instead of buckling, the rubber sleeve bulges or bows outwardly into the spaces between the ribs. Such bulging is shown to good advantage in FIGS. 7 and 8. When the sleeve is viewed in crosssection, as in FIGURE 7, the sleeve assumes a scalloped outline when it is subjected to compression. When viewed in longitudinal section, as in FIG. 8, the sleeve assumes a barrel shape. With the relatively long rubber sleeve, a greater range of resilient compression is afforded, while still providing firm support for the filler. Thus, the longer sleeve is capable of compensating for a wider range of variations in the length of the filler.

The rubber supporting member has been referred to as a sleeve, but it will be understood that the shape of the rubber supporting member may be varied. FIG. 9 illustrates one modified construction, comprising a rubber supporting member 47 which is cup-shaped and is provided with a thin bottom wall 48 at the lower end of a circular side wall 49. While the side wall 49 is generally cylindrical, it tapers downwardly at a small angle. The rubber supporting member 47 may be molded from natural or synthetic rubber, or other rubbery materials, such as various plastics. The rubber supporting members 47 supports the filler in the same manner as the rubber sleeve 39.

The foregoing description refers to a vacuum-insulated filler 2 which has a centrally located tip or tubulation 11 projecting downwardly from the bottom of the filler. Moreover, the housing or member 12 is referred to as a tip protector adapted to protect the fragile tubulation or tip 11. However, it will be realized that the present invention is fully applicable to side tubulated fillers in which the tubulation or tip projects downwardly from one side portion of the bottom wall, rather than from the center of the bottom wall. As to such side tubulated fillers, the member 12 will continue to be mounted on the center of the bottom wall and will cooperate with the rubber supporting sleeve, in the same manner as already described. However, the tubulation will not be enclosed by the member 12 but will be spaced radially from the outside thereof.

FIG. 10 illustrates a modified construction in which the longitudinal ribs which engage the rubber sleeve 39 are formed on the member which is received inside the sleeve 39, rather than outside. It will be seen that the member 12 is replaced by a similar member 50 having a side wall 51 which is formed with a plurality of outwardly projecting longitudinal ribs or the like 52, similar to the ribs 44. Except for the provision of the ribs 52, the member 50 may be similar to the member 12. The member 50 may be made of plastic, metal or other suitable material.

The socket member 40 is replaced with a socket member 53 from which the ribs 44 are omitted, so that the socket member 53 has a side wall 54 which is formed with a smooth inner surface 55. The rubber sleeve 39 is confined between the inner surface 55 and the ribs 52 on the inner member 50.

When the rubber sleeve 39 is subjected to a longitudinal compressive force, the sleeve bulges inwardly between the ribs 52. The inward bulging is indicated at 56 in FIG. 10. This inward bulging has much the same effect as the outward bulging which is shown in FIGS. 7 and 8. Thus, the rubber sleeve 39 is enabled to serve as a resiliently compressible supporting member which protects the vacuum-insulated filler from being damaged due to shock. The ribs 52, in cooperation with the outer wall 54, prevent the rubber sleeve 39 from buckling. Thus, the sleeve 39 is able to withstand a considerable compressive force while continuing to provide a stable yet resilient support for the vacuum-insulated filler.

Various other modifications, alternative constructions and equivalents may be employed without departing from the true spirit and scope of the invention, as exemplified in the foregoing description and defined in the following claims.

I claim:

1. In a thermos bottle, the combination comprising a protective jacket having a side wall and a bottom wall, a vacuum-insulated filler received within said protective jacket and having a centrally disposed downwardly projecting fragile tubulation thereon, a generally cup-shaped tubulation projector mounted on said filler around said tubulation, said protector having a downwardly tapering side wall and a downwardly facing annular shoulder extending around the upper portion of said side wall, a generally cylindrical sleeve made of soft resilient rubbery material and received around said side wall of said tubulation protector with the upper end of said sleeve engaging said downwardly facing annular shoulder, the lower end of said sleeve projecting below the lower end of said tubulation protector, and a socket member mounted centrally on said bottom wall of said jacket, said socket member having a downwardly tapering socket therein with an upwardly facing annular shoulder extending around the lower portion of said socket, said socket member having a plurality of ribs projecting radially into said socket and extending longitudinally therealong, said sleeve being received in said socket with the lower end of said sleeve engaging said upwardly facing annular shoulder, the outside of said sleeve being in snug engagement with said ribs, whereby said sleeve provides a resiliently spring support for said filler and is adapted to bulge outwardly between said ribs when compressed longitudinally by force applied to said filler.

2. In a thermos bottle, the combination comprising a vacuum-insulated filler having a centrally disposed downwardly projecting fragile tubulation thereon, a protective jacket received around said filler and having a bottom wall below said tubulation, a protector around said tubulation, a soft resilient rubbery sleeve disposed around said protector and extending between said protector and said bottom wall for resiliently supporting said fillers, and means on said bottom wall forming a socket member with a socket therein receiving said sleeve, said socket member having a plurality of spaced projections extending into said socket and engaging said sleeve whereby resilient compression of said sleeve will cause said sleeve to bulge outwardly between said projections.

3. In a thermos bottle, the combination comprising a protective jacket having a side wall and a bottom wall, a vacuum-insulated filler received within said jacket and having a centrally disposed downwardly projecting fragile tubulation thereon, a generally cup-shaped tubulation protector mounted on said filler around said tubulation, said protector having a downwardly facing annular shoulder thereon, a soft resilient rubbery supporting member having a generally cylindrical side wall received around said tubulation protector with the upper end of said supporting member engaging said downwardly facing shoulder, and a socket member on said bottom wall of said jacket, said socket member having a socket therein above an upwardly facing lower wall, said supporting member being received in said socket with the lower end of said supporting member engaging said lower wall, said socket member having a plurality of angularly spaced longitudinal ribs projecting radially into said socket and engaging the outside of said generally cylindrical side wall of said rubbery supporting member, whereby said side wall of said supporting member is adapted to bulge outwardly between said ribs when compressed longitudinally by force applied to said filler.

4. In a thermos bottle, the combination comprising a protective jacket having a side wall and a bottom wall, a vacuum-insulated filler received within said jacket and having a centrally disposed downwardly projecting fragile tubulation thereon, a generally cup-shaped tubulation protector mounted on said filler around said tubulation, said protector having a downwardly facing annular shoulder thereon, a soft resilient rubbery supporting member having a generally cylindrical side wall received around said tabulation projector with the upper end of said supporting member engaging said downwardly facing shoulder, and a socket member on said bottom wall of said jacket, said socket member having a socket therein above and upwardly facing lower wall, said supporting member being received in said socket with the lower end of said supporting member engaging said lower wall, said socket member having a plurality of spaced projections extending into said socket and affording external support to prevent buckling of said cylindrical side wall of said rubbery supporting member, said side wall of said supporting member being adapted to bulge outwardly between said projections when compressed longitudinally by force applied to said filler.

5. In a thermos bottle, the combination comprising a vacuum-insulated filler having a centrally disposed downwardly projecting fragile tubulation thereon, a protective jacket received around said filler and having a bottom wall below said tubulation, a protector around said tubulation, a soft resilient rubbery sleeve disposed around said protector and extending between said protector and said bottom wall for resiliently supporting said filler, and means on said bottom wall forming a socket member with a socket therein receiving said sleeve, said protector having a plurality of spaced projections extending outwardly and engaging said sleeve whereby resilient compression of said sleeve will cause said sleeve to bulge inwardly between said projections.

6. A combination in accordance with claim 5 in which said projections are in the form of angularly spaced longitudinal ribs extending radially outwardly from said protector.

References Cited by the Examiner

UNITED STATES PATENTS

| 1,957,263 | 4/1934 | Gray | 215—100.5 |
| 2,713,435 | 7/1955 | Venis | 215—13 |
| 2,963,187 | 12/1960 | Bramming | 215—13 |

FOREIGN PATENTS

| 1,202,425 | 7/1959 | France. |

THERON E. CONDON, *Primary Examiner.*
RAPHAEL H. SCHWARTZ, *Examiner.*